No. 878,137. PATENTED FEB. 4, 1908.
M. HIRSCH.
GARMENT SUPPORTER.
APPLICATION FILED MAR. 22, 1907.
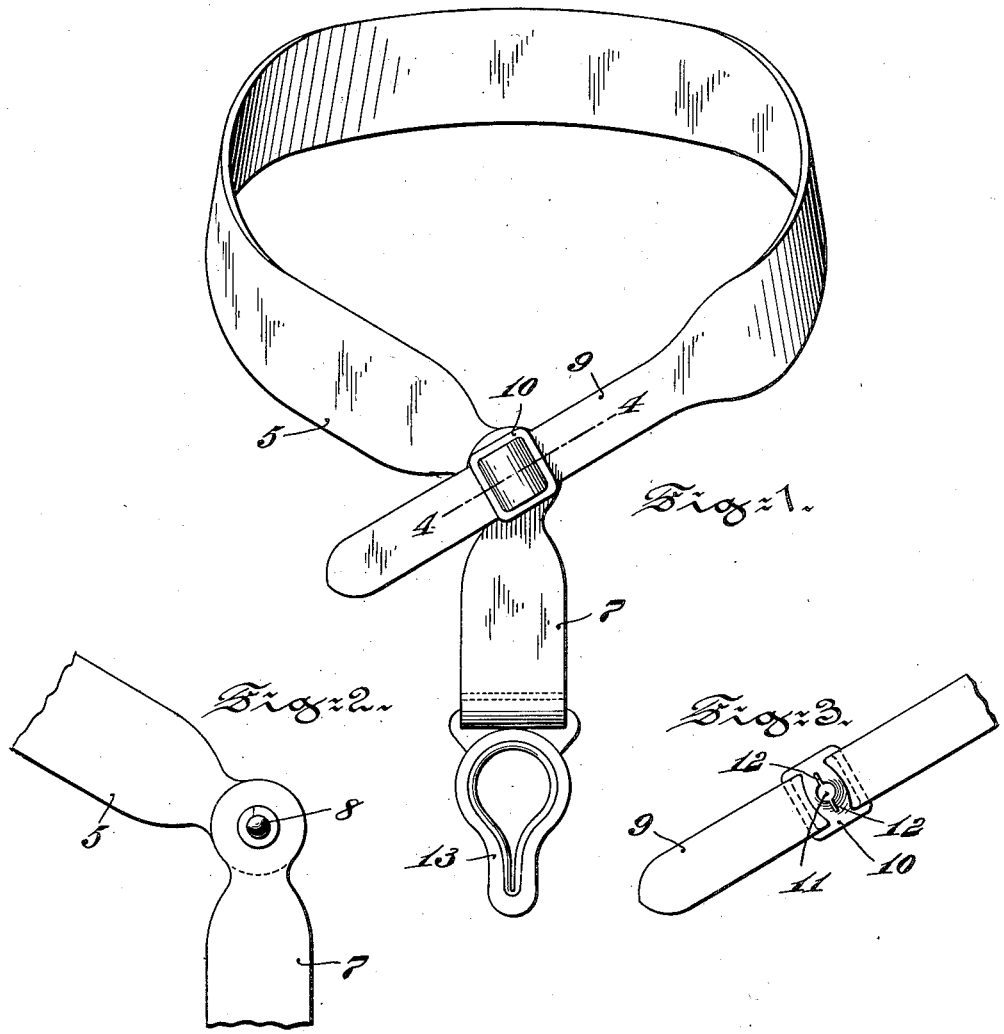
WITNESSES:
Jas. C. Wfruamith
Mae Hofmann
INVENTOR
Max Hirsch
BY
Ino Cowndal
ATTORNEY.

UNITED STATES PATENT OFFICE.

MAX HIRSCH, OF PHILADELPHIA, PENNSYLVANIA.

GARMENT-SUPPORTER.

No. 878,137.　　　Specification of Letters Patent.　　　Patented Feb. 4, 1908.

Application filed March 22, 1907. Serial No. 363,836.

*To all whom it may concern:*

Be it known that I, MAX HIRSCH, a citizen of the United States, residing at Philadelphia, in the county of Philadelphia and State of Pennsylvania, have invented a new and useful Garment-Supporter, of which the following is a specification.

My invention relates to improvements in garters.

My object is to provide improved means for conveniently securing the garter to the leg and for the convenient adjustment of the same to fit the leg.

My invention also comprises improved pivoted means in connection with said adjustable connection or fastening device to permit the garter to in a large measure, automatically adjust itself to varying conditions.

Referring to the drawings; Figure 1 is a perspective view of the garter in its operative position. Fig. 2 is an elevation showing the connecting ends of two members of the garter structure. Fig. 3 is an elevation of the underside of the strap and sliding buckle or clamping member. Fig. 4 is a sectional view of the clamping and pivoted device and associated members.

Similar numerals refer to similar parts throughout the several views.

My invention is especially applicable to garters made of leather, although it is obvious that other flexible material may be used. The main extension or flexible band 5 is approximately circular at one end and is connected at this end by the rivet 6 to the extension 7. Extension or band 7 supports at its lower end the slit member 13 for securing the stocking. The said connection between extensions or bands 5 and 7, on the rivet or post 6, is a loose connection, to permit of independent or pivotal movement thereon of the two extensions 5 and 7 with respect to each other. The end of post 6 terminates in the knob or stud 8. The other end 9 of extension 5 is preferably narrowed to fit the slide or socket member 10 which is recessed as at 11, and further slit as at 12 to coöperate by a spring snap with the stud 8.

The operation of my device is as follows;
The slide or socket member 10 can be readily moved to any desired point on the narrow portion 9 on extension 5 to secure the desirable fit of extension 5 about the leg. The band then being put in position about the leg, the member 10 is snapped over the stud 8 and the garter is secured in place. The pivotal or independent movement being permitted between member 10 and the stud 8, the other end of extension 5 and the stud 8 and the upper end of extension 7 and the stud 8 permits an independent pivotal movement between these three connected ends to secure the most comfortable adjustment or conformation of the garter to the leg. Upon the lower end of member 7 is supported the slit member 13 or any other suitable fastener for securing the stocking. This pivotal feature secures an extremely comfortable garter without the necessity of having any elastic or resilient element therein. The simple and easy adjustment of the slide or socket member 10 on extension 9, and the simple and easy engagement and disengagement of slide or socket member 10 with stud 8 makes the structure an extremely convenient one to use.

What I claim is:

1. In a garment supporter, the combination of two flat flexible bands, a loose pivot connecting said bands so that one band will turn on the pivot independently of the other band, a stud mounted on said pivotal connection, and an adjustable socket member for coöperating with the stud to disengageably connect the opposite ends of one of said bands.

2. In a garter, the combination of two flexible bands, a loose pivot providing means for securing an end to end pivotal connection therebetween, a garment fastener on the free end of one band and adjustable socket and stud means for disengageably connecting the two ends of the other band.

3. In a garter, the combination with a suitable garment fastener of two flexible bands, a loose pivot providing means for securing a pivotal connection between the two ends of one band and one end of the other band, said connection being disengageable with respect to one end of one band and also having an adjustable element.

MAX HIRSCH.

Witnesses:
　MAE HOFMANN,
　HOWARD S. OKIE.